9090X
J. Tustin,
Turn-table,
Patented Sept. 9, 1835.
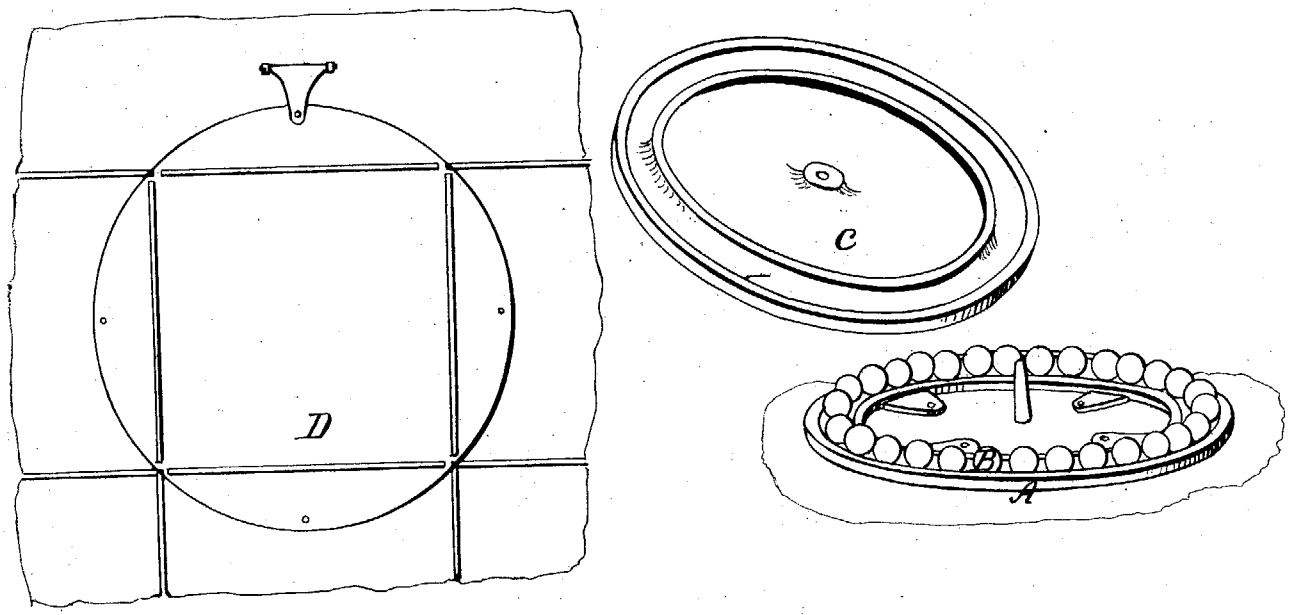

11

Sept. 9. 1835 377

John Tustin. 9090X

The schedule referred to in these letters Patent and making part of the same containing a description in the words of the said John Tustin himself of his improvement in the Railroad Revolving Platform Be it known that I John Tustin of the City and County of Philadelphia have invented a new and usefull improvement in the Railroad, Revolving Platform which is constructed of the following parts and in the following manner. The platform is formed of two parts the lower or stationary part and the upper and revolving part, the lower portion of the platform (of cast iron, wood, stone or any other suitable material) is framed in the usual manner solid, and either square or circular, it has a chanel made a little less in depth than the semi diameter of the balls intended to revolve or travel therein, This chanel if cut in wood may be lined with iron either cast or wrought and forms a compleat circle, within the channel are placed any convenient number of plain balls of hard wood, or of Metal, which balls are so near together as to cause the upper platform to revolve with ease and to support the car with safety, the platform which revolves, having an equal bearing all round, The upper portion of the platform is on a level with the surface of the ground upon the rollers or plain balls is placed the upper portion of the platform, constructed in the same manner as the lower, with the exception of short connecting rails on its upper surface to match with the road, four at right angles with each other forming a square, The revolving or upper portion of the platform may be cast entire if deemed necessary, The lower portion of the platform may be of stone, and the lower channel formed of any suitable material, The outer edge of the upper platform projects sufficiently far over the channels for the balls as to prevent the dirt that may be collected on the upper portion of the platform getting into the lower portion; a car run on to the upper portion of the platform by means of its ways, manual power is applied in any required direction, and the upper portion of the platform moves round in a horizontal manner, steadied by a pin in the centre of the lower portion of the platform, which pin enters a short distance into the revolving platform. What I claim as my invention and for which I solicit Letters Patent is the application of plain balls, to revolve in upper and lower circular channels suited to the size of the semi-diameter of the balls & the same to be applied to railways so as to constitute the Rail Road Revolving Platform as above described John Tustin Witnesses David Evans Robert Clark 537 words]

(Drawing)